United States Patent
Hasan et al.

(10) Patent No.: US 10,467,338 B2
(45) Date of Patent: *Nov. 5, 2019

(54) CORRECTION OF USER INPUT

(71) Applicant: eBay Inc., San Jose, CA (US)

(72) Inventors: Sasa Hasan, San Jose, CA (US);
Carmen Heger, San Jose, CA (US);
Amit Klein, Redwood City, CA (US);
Sanyantan Ghosh, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,275

(22) Filed: Dec. 15, 2017

(65) Prior Publication Data

US 2018/0107644 A1    Apr. 19, 2018

Related U.S. Application Data

(63) Continuation of application No. 14/802,801, filed on Jul. 17, 2015, now Pat. No. 9,870,355.

(60) Provisional application No. 62/087,702, filed on Dec. 4, 2014.

(51) Int. Cl.
*G06F 17/27* (2006.01)

(52) U.S. Cl.
CPC .................. *G06F 17/273* (2013.01)

(58) Field of Classification Search
None
See application file for complete search history.

(56) References Cited

U.S. PATENT DOCUMENTS

| | | | | |
|---|---|---|---|---|
| 6,104,323 A | * | 8/2000 | Cho | H03M 7/3088 341/50 |
| 7,630,980 B2 | * | 12/2009 | Parikh | G06F 3/0237 |
| 8,156,414 B2 | * | 4/2012 | Zandifar | H04L 1/0045 382/155 |
| 8,447,586 B2 | | 5/2013 | Aoyama et al. | |
| 9,870,355 B2 | * | 1/2018 | Hasan | G06F 17/273 |

(Continued)

OTHER PUBLICATIONS

First Action Interview—Office Action Summary received for U.S. Appl. No. 14/802,801, dated Mar. 22, 2017, 6 pages.

(Continued)

*Primary Examiner* — Satwant K Singh
(74) *Attorney, Agent, or Firm* — Schwegman Lundberg & Woessner, P.A.

(57) ABSTRACT

Systems and methods for receiving a first string from a user in a user session, tracking a first response to the first string from the user in the user session, receiving, after receiving the first string, a second string from the user in the user session, the second string having a character operator difference that is below a threshold number from the first string, tracking a second response to the second string from the user in the user session, associating the first string with the second string in response to the second response comprising a higher number of responses as compared with the first response, removing the association between the first string with the second string in response to the second string being a correction of the first string, and correcting, using the association, user input by replacing a portion of the user input that matches the first string with the second string.

20 Claims, 15 Drawing Sheets

(56) References Cited

U.S. PATENT DOCUMENTS

| | | | | |
|---|---|---|---|---|
| 2015/0286953 | A1* | 10/2015 | Papadopoullos | G06F 17/2785 706/12 |
| 2015/0379300 | A1* | 12/2015 | Terada | G06K 9/00469 726/28 |
| 2017/0017636 | A1 | 1/2017 | Hasan | |

OTHER PUBLICATIONS

First Action Interview—Pre-interview Communication received for U.S. Appl. No. 14/802,801, dated Jan. 3, 2017, 4 pages.

Notice of Allowance received for U.S. Appl. No. 14/802,801, dated Sep. 8, 2017, 9 pages.

Response to First Action Interview—Office Action Summary filed on Jun. 22, 2017, for U.S. Appl. No. 14/802,801, dated Mar. 22, 2017, 9 pages.

Response to First Action Interview—Pre-interview Communication filed on Feb. 3, 2017, for U.S. Appl. No. 14/802,801, dated Jan. 3, 2017, 7 pages.

Och et al., "A Systematic Comparison of Various Statistical Alignment Models", Computational Linguistics, vol. 29 Issue 1, Mar. 2003, pp. 19-51.

Koehn et al., "Moses: Open Source Toolkit for Statistical Machine Translation", Proceeding ACL '07 Proceedings of the 45th Annual Meeting of the ACL on Interactive Poster and Demonstration Sessions, Jun. 25-27, 2007, pp. 177-180.

Heafield, "KenLM: Faster and Smaller Language Model Queries", Proceedings of the 6th Workshop on Statistical Machine Translation, Jul. 30-31, 2011, pp. 187-197.

Och, "Minimum Error Rate Training in Statistical Machine Translation", Proceeding ACL '03 Proceedings of the 41st Annual Meeting on Association for Computational Linguistics—vol. 1, Jul. 7-12, 2003, pp. 160-167.

Tiedemann, "Character-based Pivot Translation for Under-resourced Languages and Domains", Proceeding EACL 12 Proceedings of the 13th Conference of the European Chapter of the Association for Computational Linguistics, Apr. 23-27, 2012, pp. 141-151.

* cited by examiner

| Search query | Similar consecutive query | Edit distance | User correction? |
|---|---|---|---|
| nike air hurarche | nike air huarache | 1 | Yes |
| jordan size 9 | jordan size 9.5 | 2 | No |
| galaxy s4 | galaxy s5 | 1 | No |
| power cord forplaystation 3 | power cord for playstation 3 | 2 | Yes |
| iphine 6 | iphone 6 | 1 | Yes |
| iphone 6 plus | iphone 6 plus case | 5 | No |
| micheal kors wstches | michael kors watches | 3 | Yes |
| boots | boots men | 4 | No |
| sweter | sweater | 2 | Yes |

| Method | #queries | #tokens | MT Acc |
|---|---|---|---|
| all data | 80.5M | 235.6M | 62.0% |
| manual heuristic | 12.6M | 40.1M | 65.5% |
| ME $\tau = 0.5$ | 32.7M | 94.2M | 55.9% |
| ME $\tau = 0.65$ | 13.5M | 38.6M | 57.4% |
| ME $\tau = 0.75$ | 6.3M | 16.9M | 57.5% |

FIG. 6

| | characters | character bigrams |
|---|---|---|
| Original: | hollowin custome | |
| Preprocessing: | h o l l o w i n S c u s t o m e | ho ol ll lo ow wi in nS Sc cu st to om me |
| Translation: | h a l l o w e e n S c o s t u m e | ha al ll lo ow we ee en nS Sc co st tu um me |
| Postprocessing: | halloween costume | |

FIG. 7

CORRECTION OF USER INPUT

RELATED APPLICATIONS

This application is a continuation of and claims the benefit of priority under to U.S. patent application Ser. No. 14/802,801, filed on Jul. 17, 2015, which claims the benefit of priority under to U.S. Provisional Patent Application Ser. No. 62/087,702 filed Dec. 4, 2014, the benefit of priority of each of which is claimed hereby, and each of which are incorporated by reference herein in its entirety.

TECHNICAL FIELD

The present application relates generally to systems and methods for correction of user input at a networked system using statistical machine translation.

BACKGROUND

A user may interact with a networked system in a wide variety of different ways. In one example, a user of a network-based publication system provides user terms as input to search for items or products available at the network-based publication system. Examples include a user searching for available products at the network-based publication system.

In other examples, a user posts messages, asks questions, submits queries, selects items, views items, purchases items, or provides input in any other way to a networked system. In many examples, users spell terms incorrectly, use slang terms, shortcuts, acronyms, or provide other input that may not match officially recognized terms. Therefore, a system may have difficulty identifying what a user desires.

BRIEF DESCRIPTION OF THE DRAWINGS

Various ones of the appended drawings merely illustrate example embodiments of the present disclosure and cannot be considered as limiting its scope.

FIG. 5 is a table illustrating a set of filtered string pairs according to one example embodiment.

FIG. 6 is a table illustrating results of an input correction system according to one example embodiment.

FIG. 7 is a table illustrating character bigrams according to one example embodiment.

Figure 1:
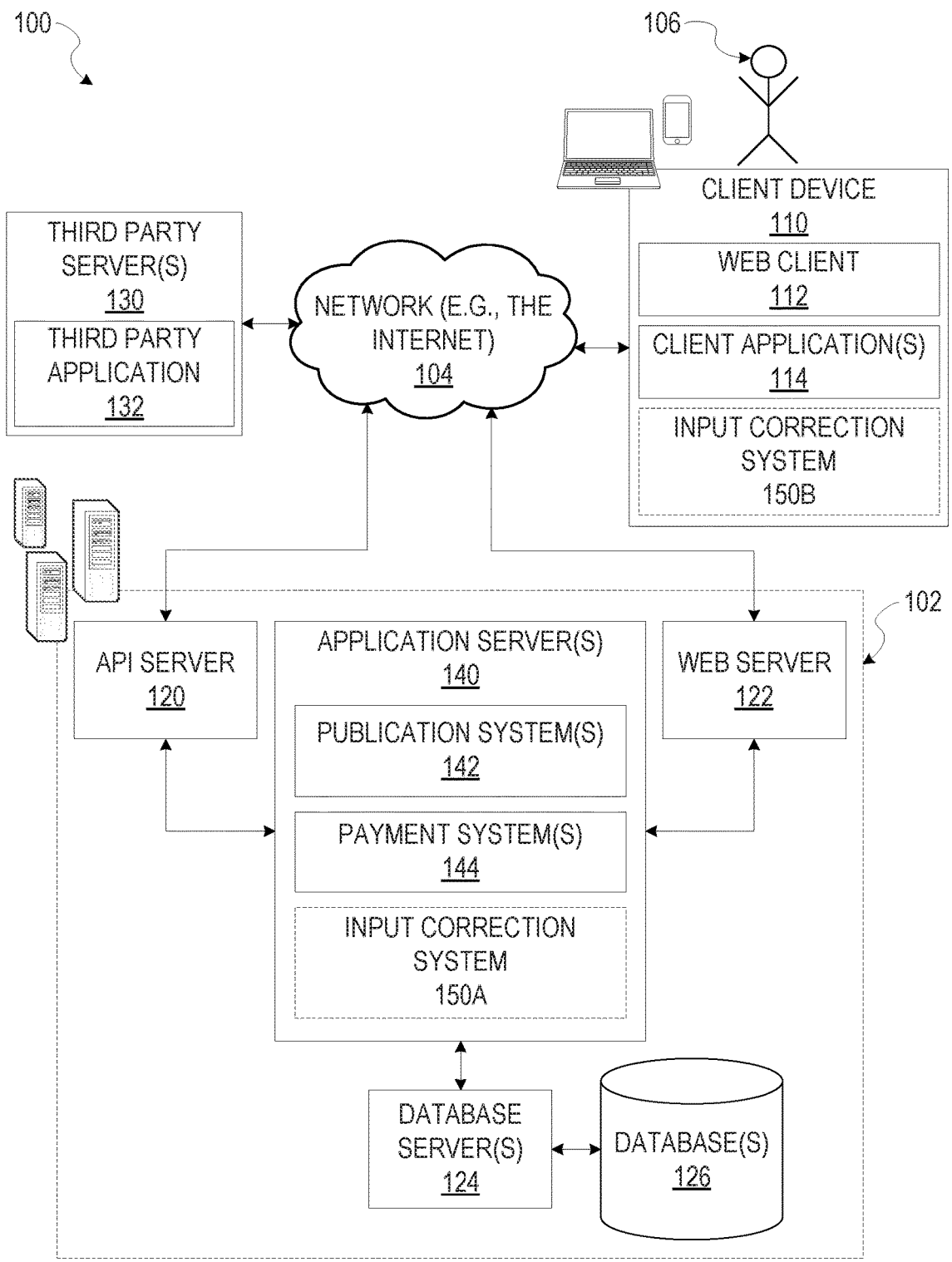
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one example embodiment, a system receives a query for an available item at a network-based publication system. The system may not return sufficient results to please the user. In response, the system may receive a subsequent query that includes certain modifications to the query. The system determines that the subsequent query is a modification of the earlier query based on a character operator difference between a term in the earlier query and a term in the subsequent query being below a threshold number.

In another example embodiment, the system data mines user input from many users and generates string pairs representing potential corrections. In this example embodiment, the first string in the string pair is selected based on the first string being received in fewer than a threshold number of times and the second string in the string pair is selected based on the second string being received in more than a threshold number of times. In one example, the first string is received fewer than 50 times and the second string is received more than 10,000 times.

In another example embodiment, the system tracks user response to input. In response to the user initiating increased response with the system, the system determines that the subsequent query more effectively generates search results that are desirable to the user. In one example, the user views, selects, or purchases items based on the subsequent query having initiated less interactions with the system in response to an earlier query. The system then stores this modification, and may similarly correct user input in other user sessions.

In another example embodiment, the system receives search terms from many different users in their respective user sessions. The search terms may not yield any search results. In response to several of the users submitting user terms that do yield results, and that are sufficiently close to the user terms that did not yield search results, the system associates the user terms that did not yield search results with a user term that did yield search results and corrects user input in other user sessions by replacing input that matches the first term with the second term.

In certain embodiments, the system monitors traffic between the user (e.g., a computing device for the user), and a networked system. The system may operate as an application being executed by a processor of a machine or may be implemented as middleware. As middleware, the system may intercept communications from other applications, such as, but not limited to, a web browser, a messaging application, a custom application, a forum application, social networking application, or other, or the like. A networked system may include, but is not limited to, a network-based publication system, a message board, a news site, a web site, a feedback forum, a search engine, or any other system that receives input from users over a network.

A system as described herein generates string pairs included in input from users. In one example, the string pairs include a first string and a second string, where the second string is a correction of the first string. The second strings in the string pairs may also include other search terms that are similar to the original search terms. In one example, "similar" means that the first search term and the second search term are within a character operator difference as will be described below. In other examples, the first string is spelled correctly, but the second string more accurately matches an item because more users use the second term to describe the item. For example, more users may use an acronym, slang terms, or other terms to describe an item that may not be recognized by a manufacturer of the product.

Using a character operator difference, as will be shown, increases the quality of string pairs. String pairs that do not reflect actual corrections will be filtered out. In one example embodiment, the string pairs are determined based on a character difference threshold to determine user input that includes similar terms.

After a number of string pairs are generated, the system may filter string pairs that are not actual corrections. For example, the system may filter out string pairs that include numerical values. For example, a user may change a query from shoes size 7 to shoes size 7.5. In this example, although the queries may be associated due to a small character difference (e.g., two), the string pair is filtered out because the different characters between the search terms is a numerical value (e.g., from 7 to 7.5).

In another example, the system may filter out string pairs where the supposed correction is an acceptable search term. For example, where many users (e.g., dozens or hundreds) corrected a query from fantastic cleaner to Fantastik cleaner the string pair may be filtered out because the potentially corrected term Fantastik is used by a sufficient number of users. This is the case even though "Fantastik" may not be the correct spelling of "fantastic."

In another example, a user may correct a search query from Nike shoes to "Nike Shoes." Although a character operator difference between the two queries is two (for the two quote characters), the string pair will be filtered out because a regular expression determines that the character difference is the addition of quotes. Therefore, these kinds of corrections will be filtered out from the set of string pairs resulting in a filtered set of string pairs. According to these and other example embodiments, the system filters out string pairs that do not represent actual corrections of search terms. The system then applies character-based statistical machine translation that is trained on the set of string pairs. The system then replaces user input in a different user session by replacing input that matches a first string in a string pair with the second string in the string pair.

With reference to FIG. 1, an example embodiment of a high-level client-server-based network architecture 100 is shown. A networked system 102, in the example forms of a network-based publication system or payment system, provides server-side functionality via a network 104 (e.g., the Internet or wide area network (WAN)) to one or more client devices 110. An input correction system 150 may be implemented as part of the client device 110 (e.g., input correction system 150B), or as part of the network system 102 (e.g., input correction system 150A). In another example embodiment, the input correction system 150 is partially implemented at the input correction system 150A and partially implemented at the input correction system 150B. FIG. 1 illustrates, for example, a web client 112 (e.g., a browser, such as the Internet Explorer® browser developed by Microsoft® Corporation of Redmond, Wash. State), client application(s) 114, and the input correction system 150B executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 comprises one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for transactions. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application server(s) 140 may host one or more publication systems 142 and payment systems 144, each of which may comprise one or more modules or applications and each of which may be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The input correction system 150 provides functionality operable to correct user input based on statistical corrections from one or more users in a variety of different ways. The input correction system 150 may store input received from the users in the database(s) 126, third party server(s) 130, and other sources. In one example embodiment, the input correction system 150 operates as part of the application server 140 and intercepts user input to the networked system 102. In another embodiment, the input correction system 150 operates as part of the client device 110 and intercepts input provided by the user 106.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and input correction system 150 could also be implemented as standalone software programs, which do not necessarily have networking capabilities.

The web client 112 may access the various publication and payment systems 142 and 144 via the web interface supported by the web server 122. The input correction system 150A may gather the various user input originating at the client device 110. Similarly, the input correction system 150A may accesses the various services and functions provided by the publication and payment systems 142 and 144 via the programmatic interface provided by the API server 120. The input correction system 150 may also operate, at least partially, as part of a seller application (e.g., the Turbo Lister application developed by eBay® Inc., of San Jose, Calif.) to enable sellers to author and manage listings on the networked system 102 in an off-line manner, and to perform batch-mode communications with the networked system 102.

Figure 2:
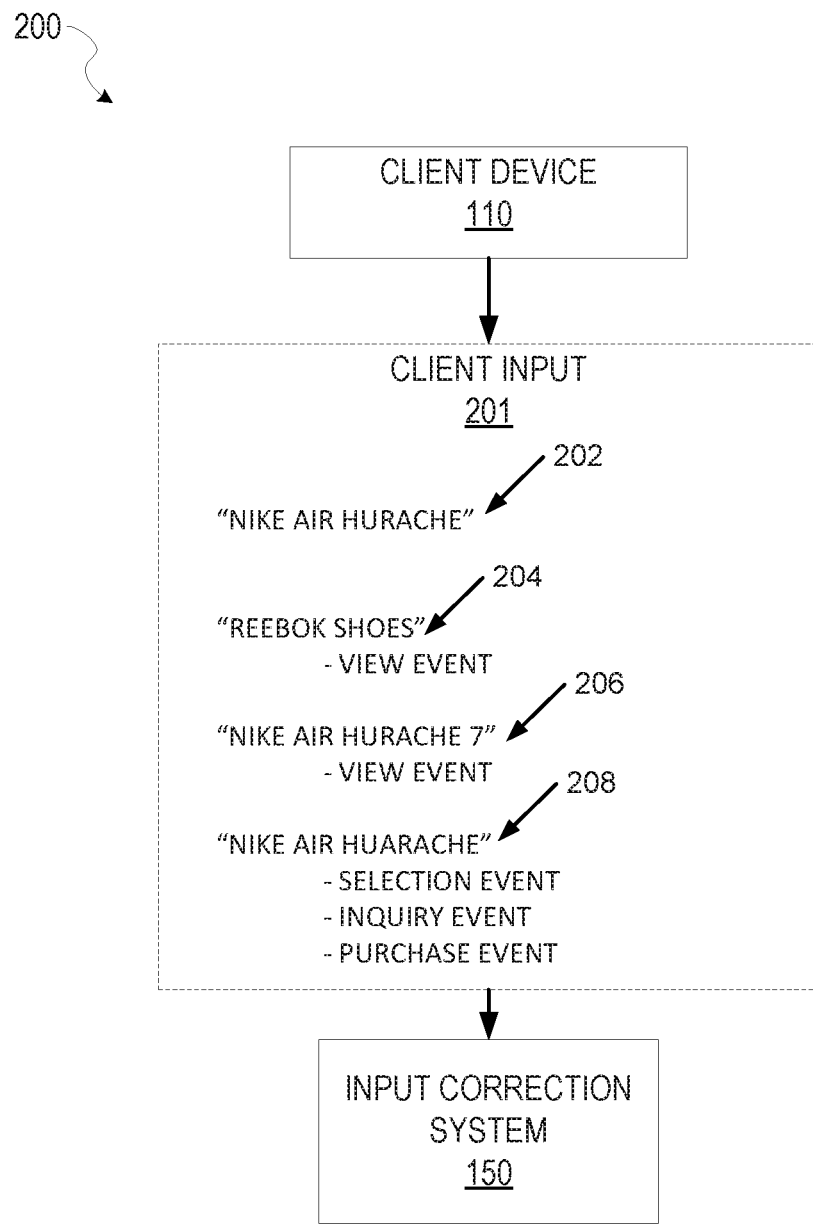
FIG. 2 is an illustration depicting user input according to one example embodiment.

FIG. 2 is an illustration depicting user input according to one example embodiment 200. In this example, the input correction system 150 receives a first query 202 from a user that includes the user terms "NIKE AIR HURACHE." The user may not initiate any user actions in response to this query because of the misspelled term "Hurache" causing no search results to be returned. Later, in the same user session, the user submits a second query 204 that includes the user terms "REEBOK SHOES." The user then also views one of the search results but causes no other user events. Later, in the same user session, the user submits a search query 206 that includes the user terms "NIKE AIR HARACHE 7," and again views one of the search results. After the previous query 206, the user submits a search query 208 that includes the user terms "NIKE AIR HUARACHE." The user then initiates several user events based on the search results. For example, the user selects a search result, inquires about the search results, and purchases an item that was included in the search results.

In another example embodiment, the input correction system 150 receives the strings in many different user sessions. In one example embodiment, the input correction system 150 selects string pairs from the user input, wherein strings in the string pair differ by a threshold number of character operators. For example, in response to the threshold number of character operators being three, the input correction system 150 selects two string pairs, such as, but not limited to, (NIKE AIR HURACHE, NIKE AIR HURACHE 7) and (NIKE AIR HURACHE, NIKE AIR HUARACHE). The first string pair is selected because the character difference is two characters "7," and the second string pair is selected because the character operator difference is one (the additional 'A' in "HUARACHE"). Furthermore, the input correction system 150 determines that the second string in each string pair resulted in increased response from the user as compared with the first string in the string pair.

In one example embodiment, the input correction system 150 filters the string pairs to generate a filtered set of string pairs. The filtered set of string pairs includes string pairs that have been determined to be corrections. For example, the second string in the string pair is a user correction of the first string in the string pair. In this example, the input correction system 150 includes the second string pair (NIKE AIR HURACHE, NIKE AIR HUARACHE) in a filtered set of string pairs. In this example, the input correction system 150 determined that the first string pair (NIKE AIR HURACHE, NIKE AIR HURACHE 7) was not a correction because of the mere addition of a numerical value.

In one example embodiment and in a different user session, the input correction system 150 replaces "NIKE AIR HURACHE" that is included in user input with "NIKE AIR HUARACHE" based on the string pair in the filtered set of string pairs.

In other example embodiments, the input correction system 150 receives the input without regard to user sessions. In this example embodiment, the input correction system 150 receives the queries and assembles the queries in the database 126. The input correction system 150 then generates the string pairs as previously described.

In another example, the string pairs also include a category. For example, a string pair that includes "NIKE HUARACHE" may be included in a "shoes" category, and/or an "apparel" category.

In one example embodiment, the input correction system 150 receives user input and matches user input with one or more term in generated string pairs. For example, the user input may include the term "chaito." "Chaito" may be included in more than one string pair. In one example, a string pair includes (Chaito, Casio) and may be in an electronics category. In another example, a string pair includes (Chaito, Chair) and may be in a furniture category. In response to receiving user input from a publisher that sells furniture, the input correction system 150 selects the (Chaito, Chair) string pair. In response to receiving the user input from a publisher that sells electronics, the input correction system 150 selects the (Chaito, Casio) string pair. Therefore, the input correction system 150 may consider a category of the string pair and correct user input using a string pair that matches the category of a publisher of the user input.

In one example embodiment, the input correction system 150 generates a category vector for each category associated with a user term. The input correction system 150 may also classify the user input into one of the category vectors using a classification system as one skilled in the art may appreciate. Weights returned from the classification system may form the category vector for the user input. The input correction system 150 then computes a differential between the category vector for the user input and the category vector for each category. The input correction system 150 may determine the category to use for the user input based, at least in part, on the category vector with the least differential between the category vector and the user input category vector. In one example, the differential is the product of the category vector and the user input category vector.

In another example embodiment, the input correction system 150 trains on a set of user input and is configured to generate a probability for one or more categories. In response to user input matching the first term in a string pair, the input correction system 150 may determine matching probabilities for the categories and selects the string pair that is included in the category with the highest probability.

Figure 3:
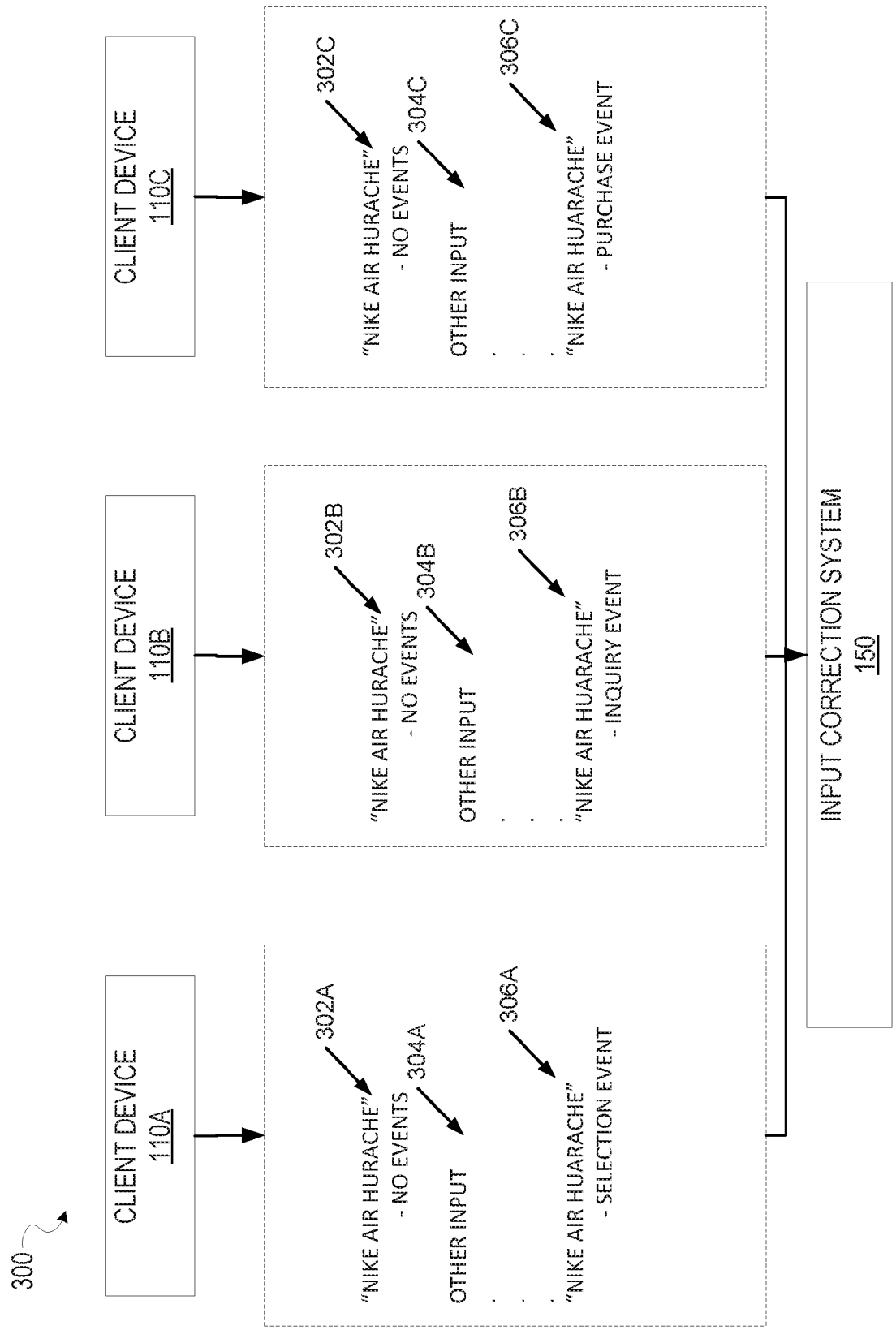
FIG. 3 is another illustration depicting user input according to one example embodiment.

FIG. 3 is another illustration depicting user input according to one example embodiment. In this example, the input correction system 150 receives a first query 302A from a first client device 110A. A user of the client device 110A may not initiate any user events in response to receiving search results based on the first query 302A. Later, in the same session, the client device 110A provides other input 304a that may not be related to the first query 302A. Also, later in the same session, the client device 110A provides a second query 306A that includes the search terms "NIKE AIR HUARACHE." The user of the client device 110A then initiates a selection event.

In other user sessions, such as sessions between client devices 110B, 110C and the networked system 102, respective users of the client devices 110B, 110C submit queries 302B and 302C. As with client device 110A, the misspelled user input may not yield sufficient search results to motivate the user to select or view one of the search results.

In the same respective sessions, the users may provide other input 304B, 304C and may subsequently submit search queries 306B, 306C that include the correctly spelled "NIKE AIR HUARACHE." In response, the respective users of client devices 110B, 110C initiate user events. For example, the user of client device 110B submits an inquiry regarding one of the items returned in search results based on the query 306B. In another example, the user of the client device 110C purchases one of the items returned in search results based on the query 306C.

In one example embodiment, the input correction system 150 selects string pairs from the user input in the user sessions for the client devices 110A, 110B, 110C, wherein the strings in the string pair differ by a threshold number of character operators. For example, in response to the threshold number of character operators being three, the input correction system 150 selects the string pair (NIKE AIR HURACHE, NIKE AIR HUARACHE). Furthermore, the input correction system 150 determines that the respective queries 306 based on the second string in the string pair resulted in user events, whereas the first string in the string pair did not. In one example embodiment and in a different user session, the input correction system 150 replaces "NIKE AIR HURACHE" that is included in user input with "NIKE AIR HUARACHE" based on the string pair in the filtered set of string pairs.

In another example embodiment, the string pair includes substrings of user input. In one example, the string pair previously described includes (Hurache, Huarache). Therefore, the input correction system 150 is not limited regarding the user input and may determine strings as independent user terms divided by a space or punctuation mark, or other character, or the like.

Figure 4:
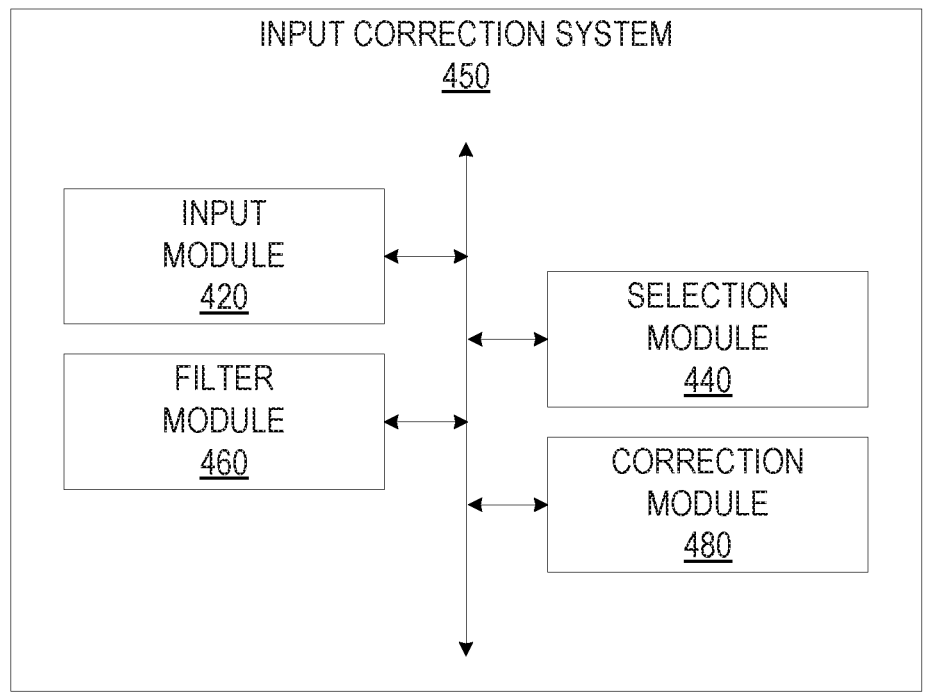
FIG. 4 is a block diagram illustration an input correction system according to one example embodiment.

FIG. 4 is a block diagram illustrating an input correction system 450 (which may be the input correction system 150) for correcting user input according to one example embodiment 400. In one example embodiment, the input correction system 450 includes an input module 420, a selection module 440, a filter module 460, and a correction module 480.

The input module 420, in certain examples, is configured to receive user input to the networked system 102. The input module 420 parses the various user inputs with the networked publication system 142 and generates strings representing the user input. For example, the strings may include queries, selections, views, or other actions by the user in a user session.

In certain embodiments, the user may alter previous input and provide a subsequent correction of the previous input. The correction may include correcting misspelled words, but of course, this is not necessarily the case. In other examples, the subsequent query may include other terms recognizable by a user, although the other terms may or may not be spelled correctly according to a spelling authority, such as, but not limited to, a dictionary, a language model, or the like.

In one embodiment, the selection module 440 generates string pairs by associating an earlier string with a later string (in the same session) where a character operator difference between the two strings is below a threshold value. Of course, this not necessarily the case, as the selection module 440 may select string pairs in a large database of user input terms. As described herein, a character operator difference includes a number of character operations needed to alter the earlier string into the later string. For example, adding a character is one character operation, removing a character is another operation, substituting one character for another is another character operation, and transposing two characters is a single character operation. Therefore, a character difference between two strings may be described as a character operator difference.

In a specific example, the character operator difference may be based on a Damerau-Levenshtein distance as one skilled in the art may appreciate. In one specific example, the character operator difference may be three and the selection module 440 associates strings with a character operator distance of three or less. Of course, other values may be used, and this disclosure is not limited in this regard.

In one embodiment, the selection module 440 limits association to user input that was received in the same session. In one example, the input module 420 may limit a user session to a threshold number of seconds. For example, the threshold number of seconds may be 20 seconds. Therefore, according to some example embodiments, the selection module 440 may not associate strings that were received more than 20 seconds apart.

The filter module 460 is configured to filter the generated pairs of strings, where the second of the strings in the pair is not a correction to the first of the strings in the pair, resulting in a filtered set of string pairs. As previously described, the selection module 440 generates pairs of strings; however, many of the string pairs are not actual corrections.

In one example, a string pair includes (iphone 5, iphone 5s). Although there is a one-character operator difference between the two strings, the second string "iphone 5s" is not a correction to the first string "iphone 5," but is a refinement. The filter module 460 may determine that the second string is a refinement because the language model may recognize 5s as a correct term. Furthermore, the language model may recognize that 5s in the same query as an iphone is particularly acceptable because 5s may be a recognized model number for an iPhone. The filter module 460 may remove such refinements from the sets of string pairs so that remaining pairs represent a high quality set of spelling corrections (e.g., include actual spelling corrections).

In another example embodiment, the filter module 460 removes a string pair from the set based on a use ratio being above a threshold value. According to a language model, a term in the strings may be assigned a use value, probability, or frequency. Strings that are commonly used in the language model result in high values, whereas strings that are not used, or used infrequently, result in lower values. In one example, where a string includes many terms, the use value for the string is a lowest use value for the terms in the string. The filter module 460 may determine a ratio of these use values to determine a language model use ratio.

In one example, where a search term in the first string of a string pair includes a high frequency of use (e.g., the term is commonly used in the language) and the potentially corrected term in the second string of the string pair includes a low frequency of use (e.g., the potentially corrected term is either not recognized or is not generally used in the language), a language model use ratio of the first term to the second term may be higher than one. Such a ratio value may further suggest that the string pair is not an actual correction because the first term is more widely used than the second term according to the language model.

Furthermore, where a search term in the second string includes a high use frequency, according to the language model, the language model ratio will be a much lower value. Therefore, string pairs where the second string is a correction of the first string will likely have a language model ratio that is lower than one. Accordingly, in one example embodiment, the filter module 460 removes string pairs with a language model ratio that is lower than one. Of course, other values may be used, and this disclosure is not limited in this regard. Therefore, in one example embodiment, the filtered set of string pairs includes string pairs having a language model use ratio above a threshold value.

In one example, the string pair may be (Bluetooth earphones, Bluetooth earhpones). Because the terms in the first string are correctly spelled, they will have a high use frequency according to the language model. Because the terms in the second string are not correctly spelled, the second string will have a low use frequency according to the language model. Accordingly, a use ratio of the first string to the second string will be higher than one, and the filter module 460 will remove this pair from the set. This is beneficial because the string pair does not indicate a corrected spelling.

In another example embodiment, the string pair includes a plurality change. For example, the string pair may be (HD DVD, HD DVDs). Although a character operator difference between the two strings is one, the second string is a plurality change of the first string. Therefore, the string pair does not indicate a spelling correction, and the filter module 460 may remove the string pair from the set. In this example embodiment, the filter module 460 does not include the string pair in the filtered set of string pairs because the string pair is not a correction.

In another example embodiment, the filter module 460 removes a string pair from the set based on results from a regular expression. In one example, a string pair may be (Nike shoes, "Nike Shoes") (the second string including the quote characters in the string). As one skilled in the art may appreciate, a regular expression may detect the quote character beginning and terminating the second string. Accordingly, in response to a character operator difference between the two strings being two (for the two quote characters) and the regular expression indicating the presence of the quote characters, the filter module 460 may remove the string pair. This is beneficial because the addition of quotes does not likely indicate a spelling correction. Of course, one skilled in the art may produce many different regular expressions to detect similar modifications, and this disclosure is not limited in this regard. In this example embodiment, the filter module 460 does not include this string pair in the filtered set of string pairs because the string pair is not a correction.

In another example embodiment, the filter module 460 removes a string pair from the set based on the second string in the pair being a refinement of the first string in the pair. In one example, where a difference between the first string and the second string includes a missing term or an additional term, the pair does not likely indicate a spelling correction. In one example, a string pair may be (t-shirt, t-shirt xl). Although a character operator difference between the strings is three, the addition of a term does not likely indicate a spelling correction, and the filter module 460 may remove the string pair from the set resulting in a filtered set of string pairs. Furthermore, because the added term is a recognized acronym (e.g., extra-large), the string pair does not represent a spelling correction.

In another example, a string pair includes (shoes size 7, shoes size 7.5). The filter module 460 may not include the string pair in a filtered set of string pairs because the character difference between the two strings consists of a numerical value. Numerical changes more likely reflect a refinement instead of a spelling correction. Therefore, filtering these kinds of string pairs results in a set of string pairs that more likely represents actual spelling corrections.

In another example embodiment, the filter module 460 removes a string pair from the set in response to search terms in one of the strings being a predetermined language. For example, a user may configure the filter module 460 to remove string pairs that include one or more Spanish terms. In response, the filter module 460 removes string pairs that include Spanish terms.

Therefore, in one example embodiment, a filtered set of string pairs includes string pairs in a certain language and may not include strings in other languages. Although some of the string pairs may include terms from other languages, the number likely represents a small percentage of string pairs, but the set also more likely includes more spelling corrections. This is because, in some examples, a misspelled English term may closely represent a term from another language, and it is less desirous to remove this kind of spelling correction from the set.

The correction module 480, in certain examples, is configured to train a statistical machine translation framework according to pairs of strings remaining in the set. The correction module 480 receives input from another user and may correct spelling in the input based on misspelled search terms matching search terms in one or more of the string pairs.

The spelling correction framework includes splitting the search terms into sequences of lowercased characters and using a special character to mark term boundaries. After correcting the character sequences according to a language model, the correction module 480 merges the corrections back to full terms.

For training the spelling correction framework, the correction module 480 uses one or more software application tools as one skilled in the art may appreciate. Character alignment may be performed using GIZA++[1] for 4, 3 and 2 iterations of IBM Model 1, HMM, and IBM Model 3, as one skilled in the art may appreciate. Of course other numbers of iterations may be used and this disclosure is not limited in this regard.

[1] Franz Josef Och and Hermann Ney. 2003. A systematic comparison of various statistical alignment models. *Computational Linguistics*, 29(1):19-51.

For phrase extraction, the correction module 480 may use Moses[2] for standard phrase extraction, building KenLM[3] language models, and tuning. The correction module 480 may further optimize weights for the models using MERT.[4]

[2] Philipp Koehn, Hieu Hoang, Alexandra Birch, Chris Callison-Burch, Marcello Federico, Nicola Bertoldi, Brooke Cowan, Wade Shen, Christine Moran, Richard Zens, Chris Dyer, Ondrej Bojar, Alexandra Constantin, and Evan Herbst. 2007. Moses: Open source toolkit for statistical machine translation. In *Proceedings of the 45th Annual Meeting of the Association for Computational Linguistics: Demo and Poster Sessions*, pages 177-180, Prague, Czech Republic, June.
[3] Kenneth Heafield. 2011. KenLM: faster and smaller language model queries. In *Proceedings of the EMNLP 2011 Sixth Workshop on Statistical Machine Translation*, pages 187-197, Edinburgh, UK, July.
[4] Franz Josef Och. 2003. Minimum error rate training in statistical machine translation. In *Proceedings of the 41st Annual Meeting of the Association for Computational Linguistics*, pages 160-167, Sapporo, Japan, July.

In another example embodiment, the correction module 480 uses bigram characters instead of single characters, as suggested in Tiedemann,[5] in order to improve the statistical alignment models and make them more expressive.

[5] Jörg Tiedemann. 2012. Character-based pivot translation for under-resourced languages and domains. In *Proceedings of the 13th Conference of the European Chapter of the Association for Computational Linguistics*, pages 141-151, Avignon, France, April.

In another example embodiment, the selection module 440 uses a language model trained on publicly available corpora, frequent queries, or web content from the networked marketplace to calculate log-likelihoods for each string. If a use ratio (e.g., δ) of the log-likelihood first string in a string pair to the second string in the string pair is below a given threshold value (e.g., 1.01), the selection module 440 may not remove the string pair from consideration by the correction module 480. In one example where the string pair is represented as (x,y) and p(x) is the likelihood of x, and p(y) is the likelihood of y, the language model use ratio may be determined using Equation 1.

$$\delta > \frac{\log p(x)}{\log p(y)}. \qquad \text{Equation 1}$$

In another example embodiment, the selection module 440 removes string pairs in response to the second string in the string pair including a term insertion, term deletion, or numerical values. In one example, a string pair of (polo shirt, polo shirt xl) is removed because the second string in the pair includes an extra term. In another example, the string pair (nikon d700, nikon d7100) is removed because the character differences include a numerical value or the terms d700 and d7100 are recognized models for a Nikon™ camera. Therefore, in certain embodiments, a filtered set of string pairs does not include string pairs where the second string simply includes an additional term, or where the character difference between the first string in the string pair and the second string in the string pair is a numerical value.

In another example embodiment, the selection module 440 removes a string pair in response to differences in the second string in the pair including known words or terms. For example, a string pair (snake bat wooden, snake bat wood) is removed because the term "wood" is well known according to a language model. In another example, the string pair (hd dvds, hddvd) is removed because the changed term ("dvd") is a recognized term.

In another example embodiment, the selection module 440 removes a string pair in response to the string pair definitely being a language that is inconsistent with the current language model. For example, where English is the current language model, a string pair that is clearly Spanish or clearly an unknown language is removed from the set of string pairs so that English string pairs are included in a filtered set of string pairs, but string pairs that include other languages are not.

FIG. 5 is a table 500 illustrating a set of filtered string pairs according to one example embodiment. As previously described, the input module 420 generates string pairs based, at least in part, on character operation distances. Several examples of character operation differences are depicted in FIG. 5. Furthermore, the filter module 460 determines whether each of the string pairs is a user correction or not and include the string pairs that are corrections in a filtered set of string pairs.

As depicted in FIG. 5, the string pair (nike air hurache, nike air huarache) is a string pair with a character operator distance of 1. The filter module 460 may not remove this string pair from a set of string pairs because the second string in the pair represents an actual brand of Nike™ shoes, while the terms in the first string in the pair do not. The string pair (Jordan size 9, Jordan size 9.5) is filtered out by the filter module 460 because the character difference includes a numerical value as previously described.

The filter module 460 may remove the string pair (galaxy s4, galaxy s5) because a "galaxy s5" is a recognized product. Therefore, the string pair does not represent an actual spelling correction. The filter module 460 may not remove the string pair (power cord for playstation 3, power cord for playstation 3) because the string pair represents an actual spelling correction. Therefore, in certain example embodiments, a spelling correction may include two or more terms and this disclosure is not limited regarding the number of terms correctable by the trained machine translation framework. Other examples are illustrated in FIG. 5.

In one example embodiment, the filter module 460 filters string pairs using a regular expression. For example, the filter module 460 uses a regular expression to determine whether the second string in a string pair simply includes quote character additions. In response to the filter module 460 determining that the string pair includes the addition of quotes, the filter module 460 removes the string pair from consideration by the correction module 480. In this example embodiment, the filter module 460 does not include string pairs that match the regular expression in the filtered set of string pairs.

FIG. 6 is a table 600 illustrating results of an input correction system according to one example embodiment. As depicted in FIG. 6, applying these manual heuristics to generate a filtered set of string pairs, and performing machine translation using the filtered set of string pairs, demonstrates significant improvement in machine translation spelling corrections as compared with machine translation using all of the string pairs and/or machine translation using an entropy based classifier (ME).

FIG. 7 is a table 700 illustrating character bigrams according to one example embodiment. In another example embodiment, the correction module 480 corrects subsequently received strings into a sequence of lowercased characters and use a special character to denote white space or term boundaries (e.g., an 'S'). FIG. 7 shows one example of a search query being processed using Bigram character analysis as one skilled in the art may appreciate. The received string includes "hollowin costome." The correction module 480 parses the received string into a character bigram by combining each character with the subsequent character in the string, resulting in "ho ol ll lo ow wi in nS Sc cu st to om me." The correction module 480 then references the language model to correct one or more bigrams as one skilled in the art may appreciate. This results in a translated bigram that includes "ha al ll lo ow we ee en nS Sc co st tu um me." The correction module 480 then reconstructs the corrected terms using the translated bigram as indicated in FIG. 7.

Figure 8:
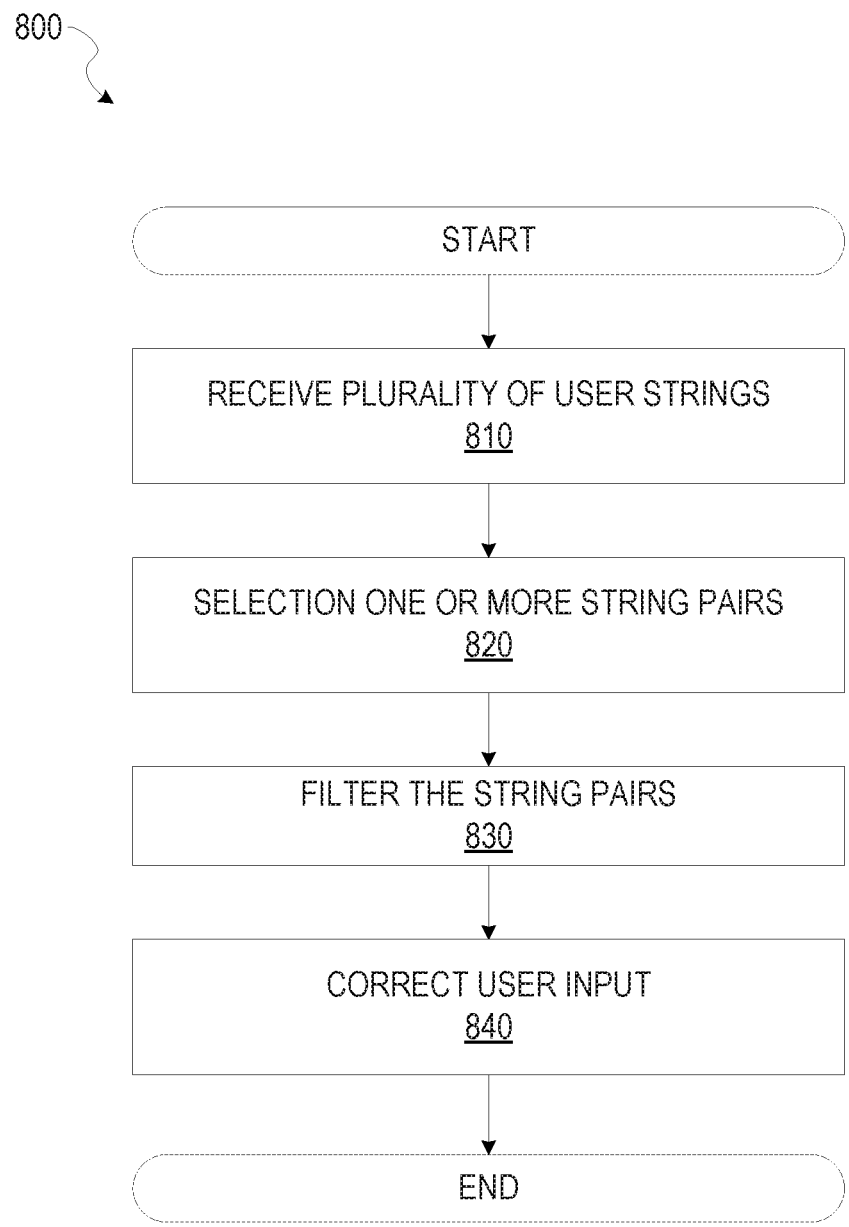
FIG. 8 is a flow chart diagram illustrating one method for correcting user input, according to one example embodiment.

FIG. 8 is a flow chart diagram illustrating one method 800 for correcting user input, according to one example embodiment. Operations in the method 800 may be performed by one or more of the modules described in FIG. 4. The method 800 includes operations 810, 820, 830, and 840.

In one example embodiment, the method 800 begins at operation 810, and the input module 420 receives a plurality of user strings in a user session. The string pairs, in one example embodiment, are based on character operator differences between the strings in the respective pairs.

The method 800 continues at operation 820, and the selection module 440 selects one or more string pairs from the plurality of user strings. The string pairs include a first string and a second string, and the selection module 440 may select the string pairs based on a character operator difference between the first string and the second string being below a threshold number.

In one example embodiment, the second string results in increased response from the user as compared with the first string. For example, the user may initiate more events following submission of the second string in the string pair than with the first string in the string pair.

The method 800 continues at operation 830, and the filter module 460 filters the string pairs one or more string pairs to generate a filtered set of strings pairs. The filtered set of string pairs includes string pairs where the second string in each string pair is a correction of the respective first string in the string pair.

In one embodiment, the correction corrects a misspelled term to a correctly spelled term according to a language dictionary. However, this is not necessarily the case. In other embodiments, the correction changes a correctly spelled term according to a language model to a term that is more recognizable by the user, although the correction may result in a term that is not spelled correctly according to a language model. Therefore, a correction comprises an alteration of a term from one form to another that may be more readily recognized by a user even if the result is a word that is not correctly spelled according to an official spelling source.

The method 800 continues at operation 840, and the correction module 480 corrects user input in a different session by replacing input that matches a first string in a filtered string pair with a second string in the filtered string pair. In another example embodiment, the correction module 480 trains a statistical machine language framework based on the filtered set of string pairs and corrects user input using the statistical machine language framework as one skilled in the art may appreciate.

The input correction system 150, therefore, allows a user to submit misspelled search terms, and the input correction system 150 accurately determines spelling corrections to determine what the user desires. The spelling corrections may include changing spelling of a term to be more consistent with current trends, fads, popularity, or other factors in term spelling. In one example embodiment, the input correction system 150 may recommend a spelling correction to a user, and the user may accept or rejection the correction.

In one example, where many people misspell a term, a statistical analysis system determines that the spelling is correct because, statistically, people tend to spell the term in that specific way. Therefore, combining statistical analysis to determine spelling corrections and using a language model to filter the corrections results in increased accuracy for spelling corrections using statistical machine translation.

A system as described herein considers full string pairs as training data for training a statistical engine. Furthermore, the input correction system 150, in one example embodiment, uses standard phrase-based machine translation modeling to derive phrase and lexical translation models for previous and subsequent user strings.

Figure 9:
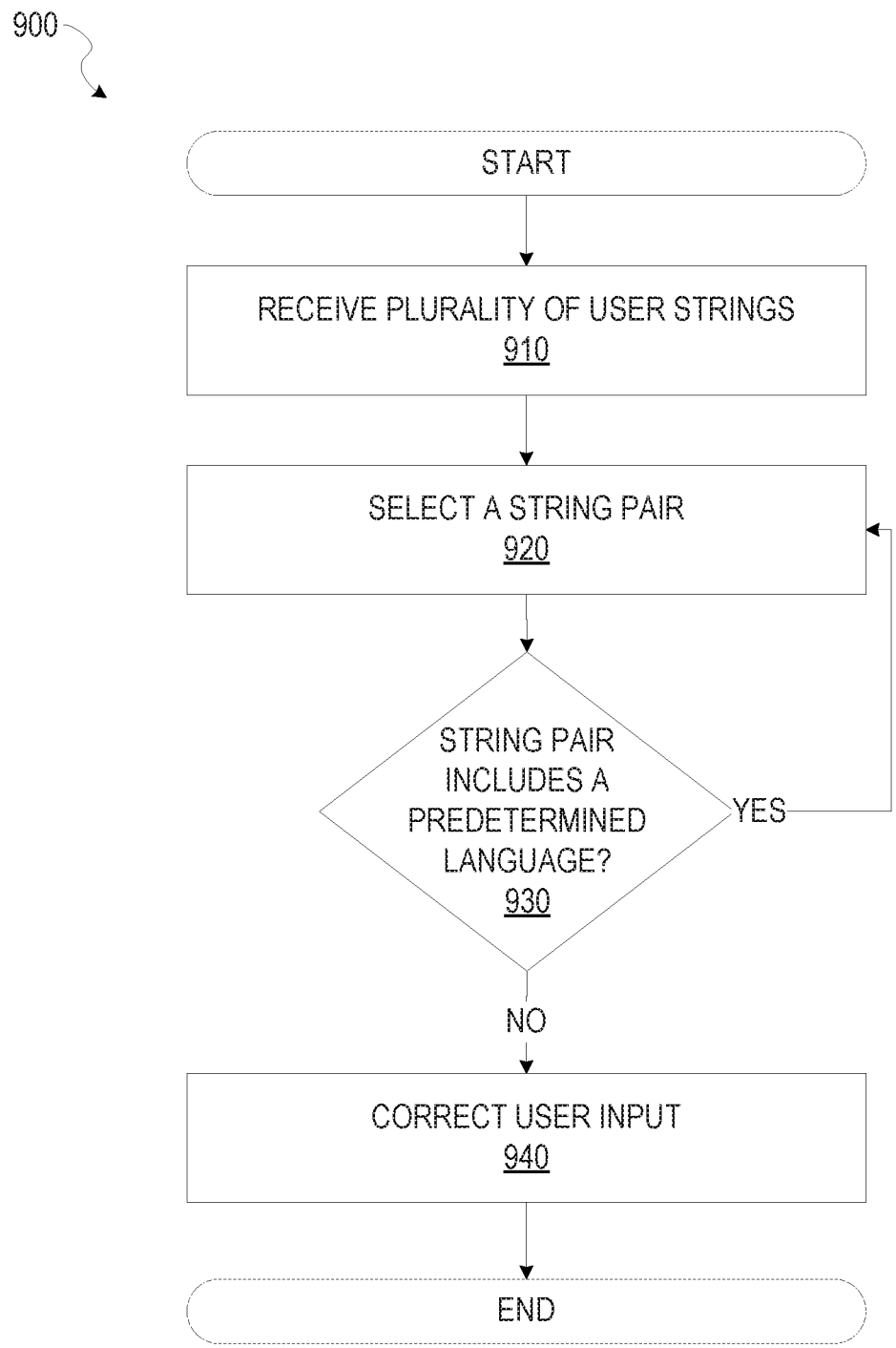
FIG. 9 is another flow chart diagram illustrating another method for correcting user input, according to one example embodiment.

FIG. 9 is another flow chart diagram illustrating another method 900 for correcting user input, according to one example embodiment. Operations in the method 900 may be performed by one or more of the modules described in FIG. 4. The method 900 includes operations 910, 920, 930, and 940.

The method 900 begins, and at operation 910, the input module 420 receives a plurality of user strings in a user session. The method 900 continues, and at operation 920, the selection module 440 selects two strings from the user session that are within a threshold character operator difference and generates a string pair that includes the two strings. In another example embodiment, the input module 420 receives the user strings in many different user sessions.

The method 900 continues, and at operation 930, the filter module 460 determines whether either string in the string pair includes a term that is part of a predetermined language. In one example, a user of the input correction system 150 indicates the predetermined language. In another example, the user indicates a preferred language and the input correction system 150 interprets other languages to be predetermined languages. For example, the user indicates that Spanish as the predetermined language, and the filter module 460 removes string pairs that include Spanish terms. In another example, the user indicates that English is the preferred language, and the filter module 460 removes string pairs that include terms in any other language. The filter module 460, accordingly, generates a filtered set of string pairs that includes terms in a specified language.

In response to the filter module 460 determining that the string pair includes a term from a predetermined language, the method 900 continues at operation 920. In response to the filter module 460 determining that the string pair does not include any term from the predetermined language, the method 900 continues at operation 940, and the correction module 480 corrects user input in another user session based on the string pairs that are included in the filtered set.

Figure 10:
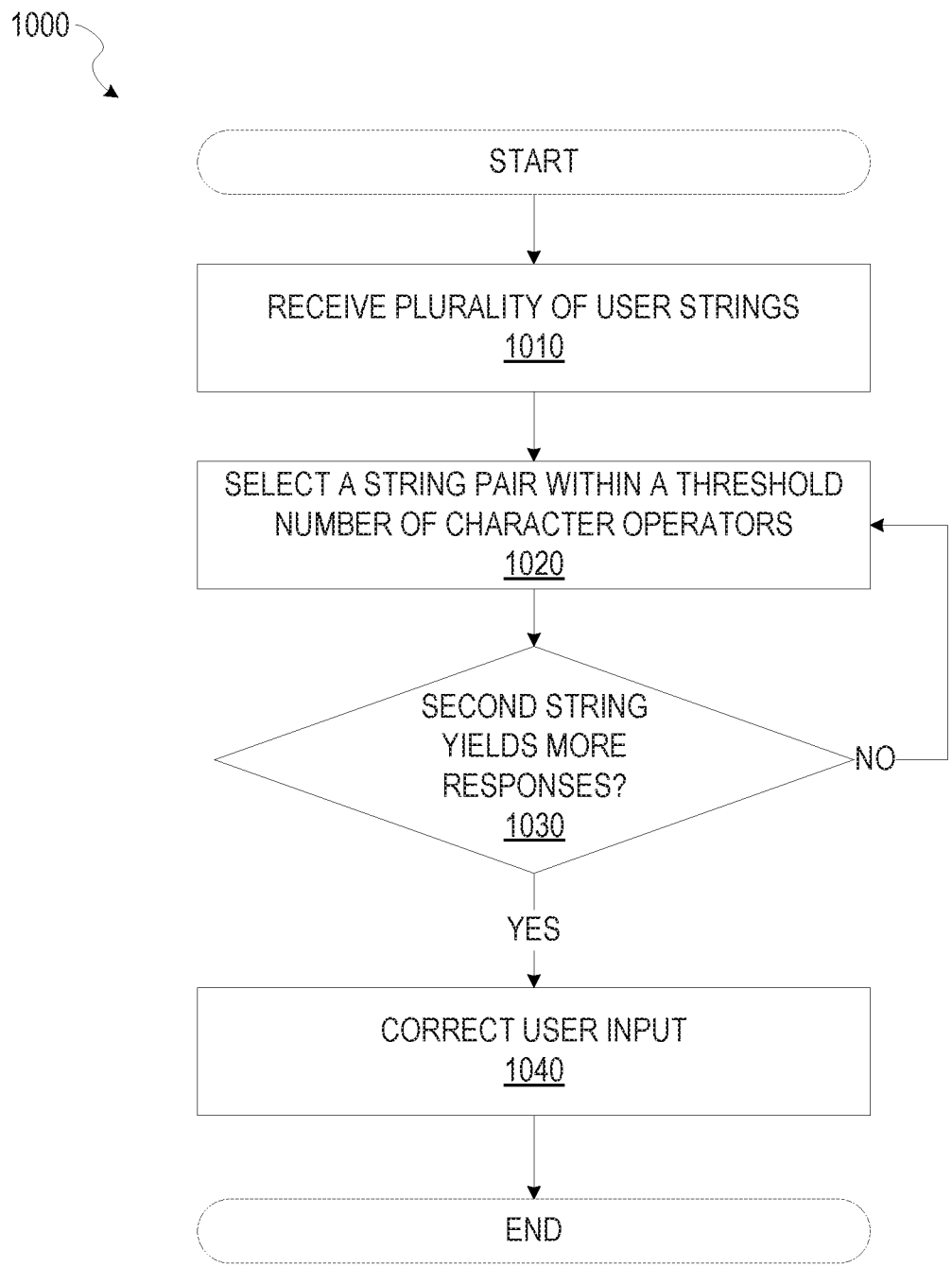
FIG. 10 is a flow chart diagram illustrating one method for correcting user input, according to another example embodiment.

FIG. 10 is a flow chart diagram illustrating one method 1000 for correcting user input, according to another example embodiment. Operations in the method 1000 are performed by one or more of the modules described in FIG. 4. The method 1000 includes operations 1010, 1020, 1030, and 1040.

The method 1000 begins, and at operation 1010, the input module 420 receives a plurality of user strings in a user session. The method 1000 continues at operation 1020, and the selection module 440 selects two strings from the user session that are within a threshold character operator difference. The method 1000 continues at operation 1030, and the selection module 440 determines whether the second of the two strings yields increased response from the user as compared with the first of the two strings. In response to the second of the two strings not yielding increased response from the user, the method 1000 continues at operation 1020 and the selection module 440 selects another string as previously described.

In response to the second of the two strings yielding increased response from the user, the method 1000 continues at operation 1040, and the correction module 480 corrects user input in a different user session based on the string pair. In another example embodiment, the correction module 480 trains a statistical machine translation framework using a filtered set of string pairs that includes the string pair described. The correction module 480 then corrects input in a different user session based on the statistical machine translation framework.

In another example embodiment of the method 1000, the filter module 460 stores the string pair in a set of filtered string pairs. The correction module 480 then further trains the statistical machine translation framework based on the set of filtered string pairs.

Figure 11:
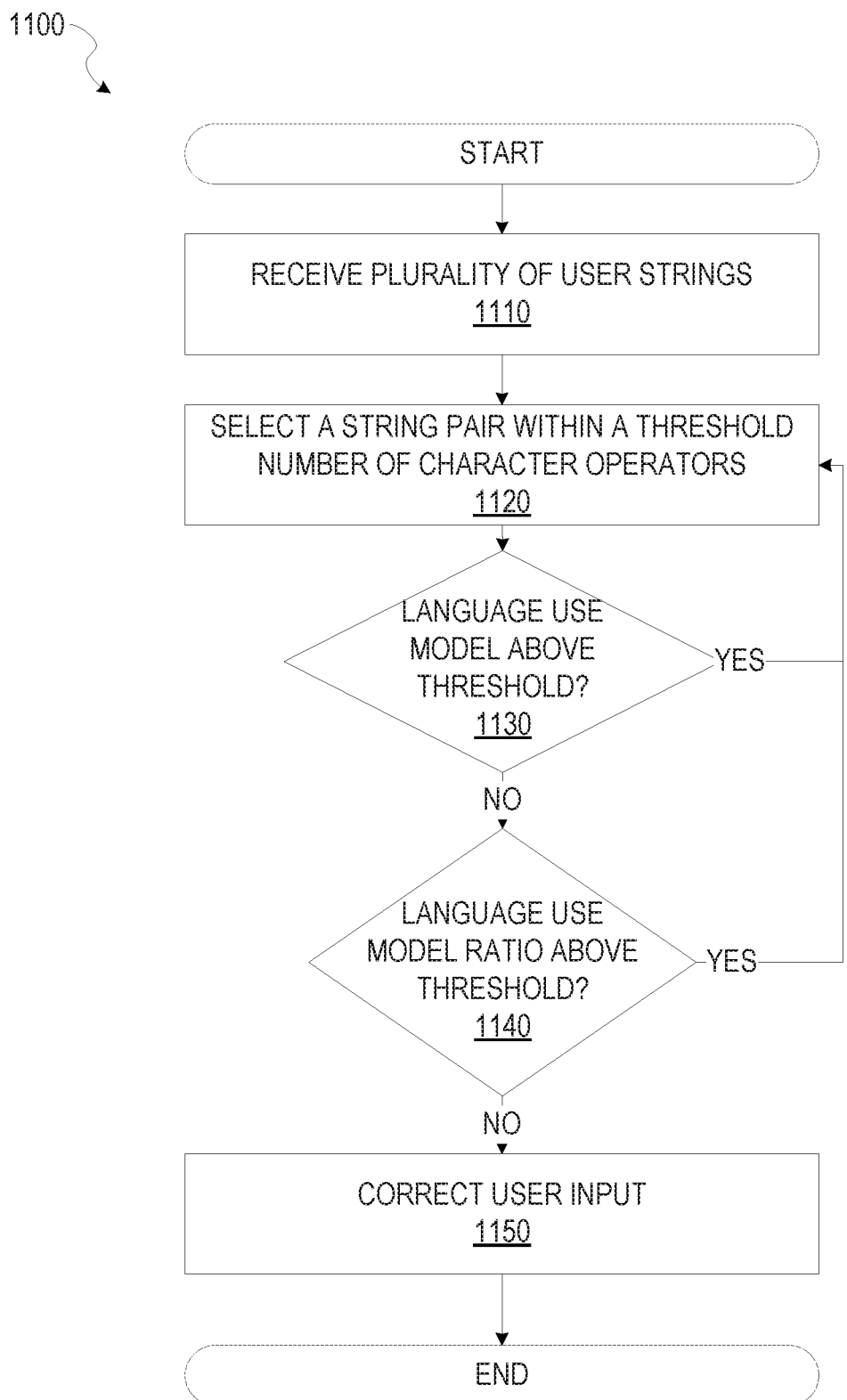
FIG. 11 is a flow chart diagram illustrating another method for correcting user input, according to an example embodiment.

FIG. 11 is a flow chart diagram illustrating another method 1100 for correcting user input, according to an example embodiment. Operations in the method 1100 are performed by one or more of the modules described in FIG. 4. The method 1100 includes operations 1110, 1120, 1130, 1140, and 1150.

The method 1100 begins, and at operation 1110, the input module 420 receives a plurality of user strings in a user session. The method 1100 continues at operation 1120, and the selection module 440 selects two strings from the user session that are within a threshold character operator difference.

The method 1100 continues at operation 1130, and the filter module 460 determines whether a language use model for the first string in a string pair is above a threshold value. In one example embodiment, a language use model indicates a frequency of use for a string in a given language. Therefore, according to the language use model, the filter module 460 determines whether the first string in a string pair is sufficiently recognized. For example, the language use model may indicate that the first string has a language use model above a threshold value and in response, the method 1100 continues at operation 1120. In this way, the filter module 460 does not include the string pair in a filtered set of string pairs. This ensures that the filtered set of string pairs includes string pairs that represent actual corrections by removing string pairs where the first string in the string pair is a recognized term in a given language.

In response to the language use model for the first string in the string pair being below the threshold value, the method 1100 continues at operation 1140. At operation 1140, the filter module 460 determines whether a language use model ratio is above a threshold value. In one example, the filter module 460 retrieves a language use model value for each string in the string pair and determines the use model ratio by dividing the use model value for the first string in the string pair by the use model value for the second string in the string pair. A language use model ratio that is above 1.0 may indicate that first string in the string pair is more frequently used in a given language than the second string in the string pair. Therefore, the string pair likely does not represent a correction. A language use model ratio that is 0.5 or lower indicates that the second string in the string pair is more prevalent in the given language than the first string in the string pair. Therefore, the language use model ratio is another indicator of whether the string pair represents a correction or not.

In response to the language use model ratio being above a threshold value at operation 1140, the method 1100 continues at operation 1120. In response to the language use model ratio not being above the threshold value, the method 1100 continues at operation 1150, and the correction module 480 corrects user input based on the string pair as previously described. In another example embodiment, the correction module 480 trains a statistical machine translation framework using a filtered set of string pairs that includes the string pair described.

Figure 12:
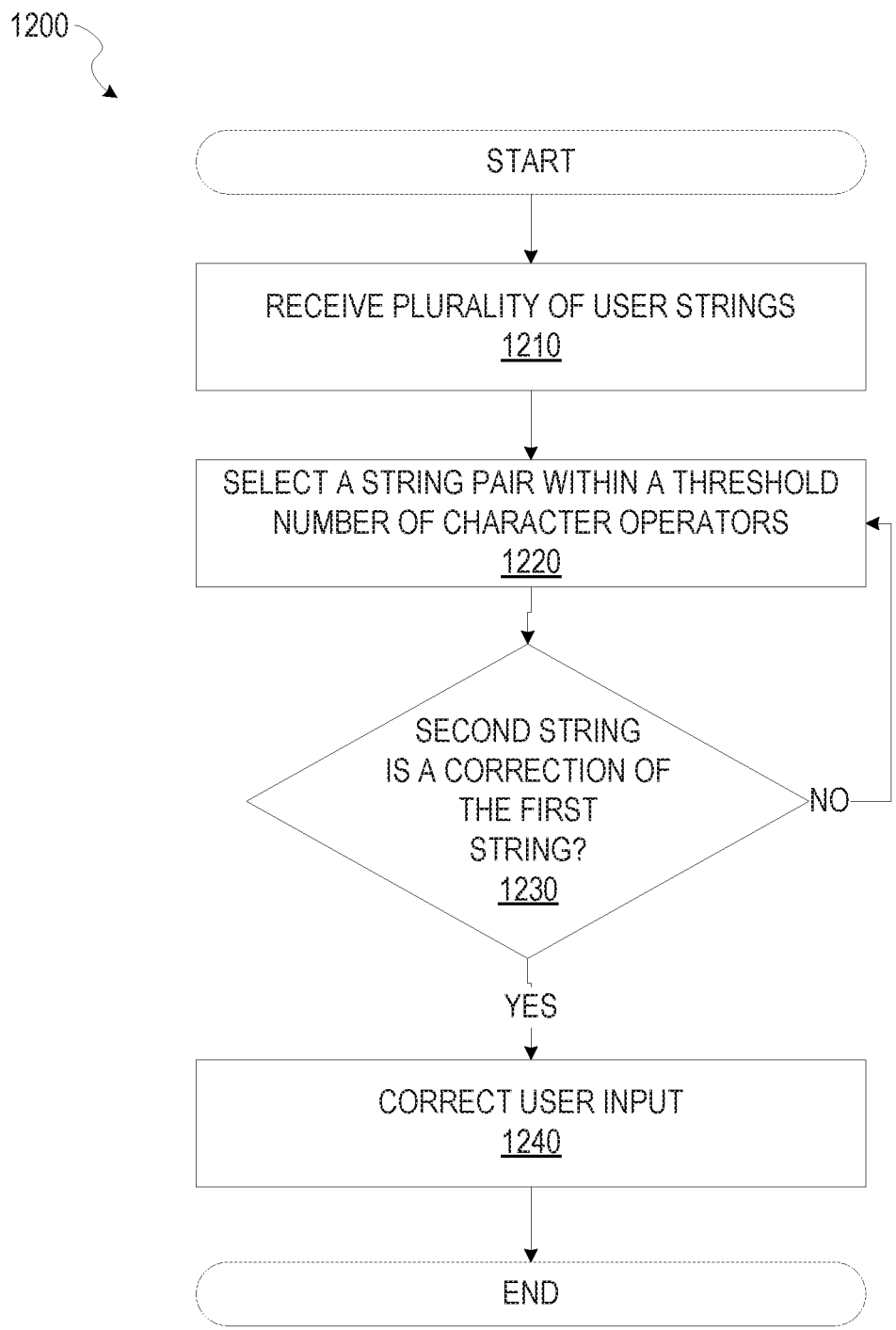
FIG. 12 is a flow chart diagram illustrating one method for correcting user input, according to another example embodiment.

FIG. 12 is a flow chart diagram illustrating one method 1200 for correcting user input, according to another example embodiment. Operations in the method 1200 are performed by one or more of the modules described in FIG. 4. The method 1200 includes operations 1210, 1220, 1230, and 1240.

The method 1200 begins, and at operation 1210, the input module 420 receives one or more user terms in a user session. The user terms may be received textually, numerically, via a selection, via a control at a graphical user interface, or by any other method as one skilled in the art may appreciate.

The method 1200 continues at operation 1220, and the selection module 440 selects two terms from the user session that are within a threshold character operator difference. The method 1200 continues at operation 1230, and the filter module 460 determines whether the second term is a correction of the first term in the two strings. In response to the filter module 460 determining that the second term is not a correction of the first term, the method 1200 continues at operation 1220. In response to the filter module 460 determining that the second term is a correction of the first term, the method 1200 continues at operation 1240. At operation 1240, the correction module 480 corrects user input in a different user session based on the two terms. In another example embodiment, the correction module 480 trains a language statistical machine framework using a set of filtered string pairs that includes the two terms and corrects the user input based on output of the statistical machine framework.

Figure 13:
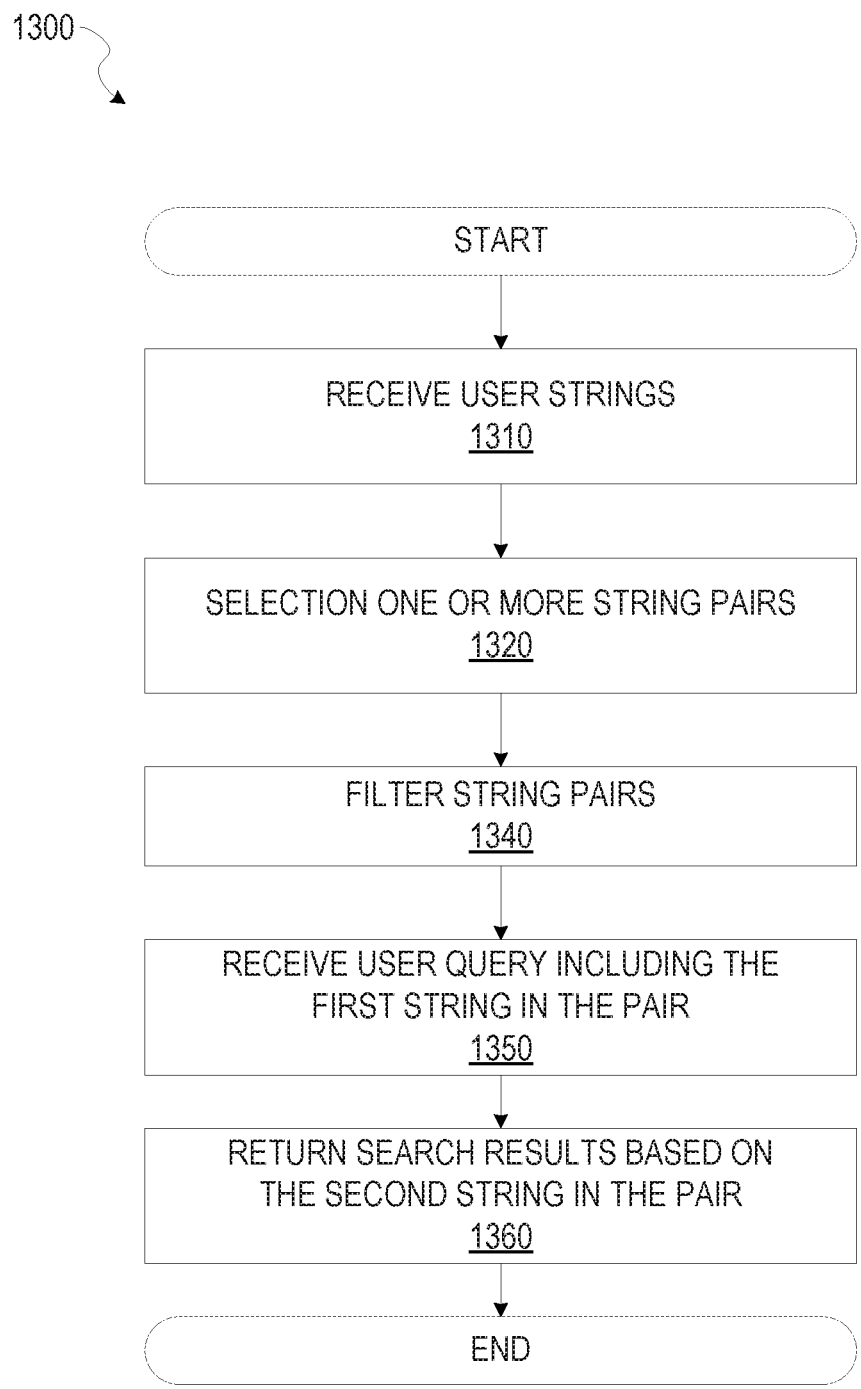
FIG. 13 is a flow chart diagram illustrating one method for correcting user input, according to another example embodiment.

FIG. 13 is a flow chart diagram illustrating one method 1300 for correcting user input, according to another example embodiment. Operations in the method 1300 are performed by one or more of the modules described in FIG. 4. The method 1300 includes operations 1310, 1320, 1340, 1350, and 1360.

The method 1300 begins, and at operation 1310, the input module 420 receives a plurality of user strings in a user session. The method 1300 continues at operation 1320, and the selection module 440 selects one or more string pairs from the user session that are within a threshold character operator difference. The method 1300 continues at operation 1340, and the filter module 460 filters the string pairs by removing string pairs that do not represent corrections resulting in a filtered set of string pairs.

The method 1300 continues at operation 1350, and the input module 420 receives an input query from a user in a different user session, where the input query includes a first string in a filtered string pair. The method 1300 continues at operation 1360, and the correction module 480 returns search results based on use of the second string in the filtered string pair.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 2-13 are implemented, in some embodiments, in the context of a machine and an associated software architecture. The sections below describe representative software architectures and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 14:
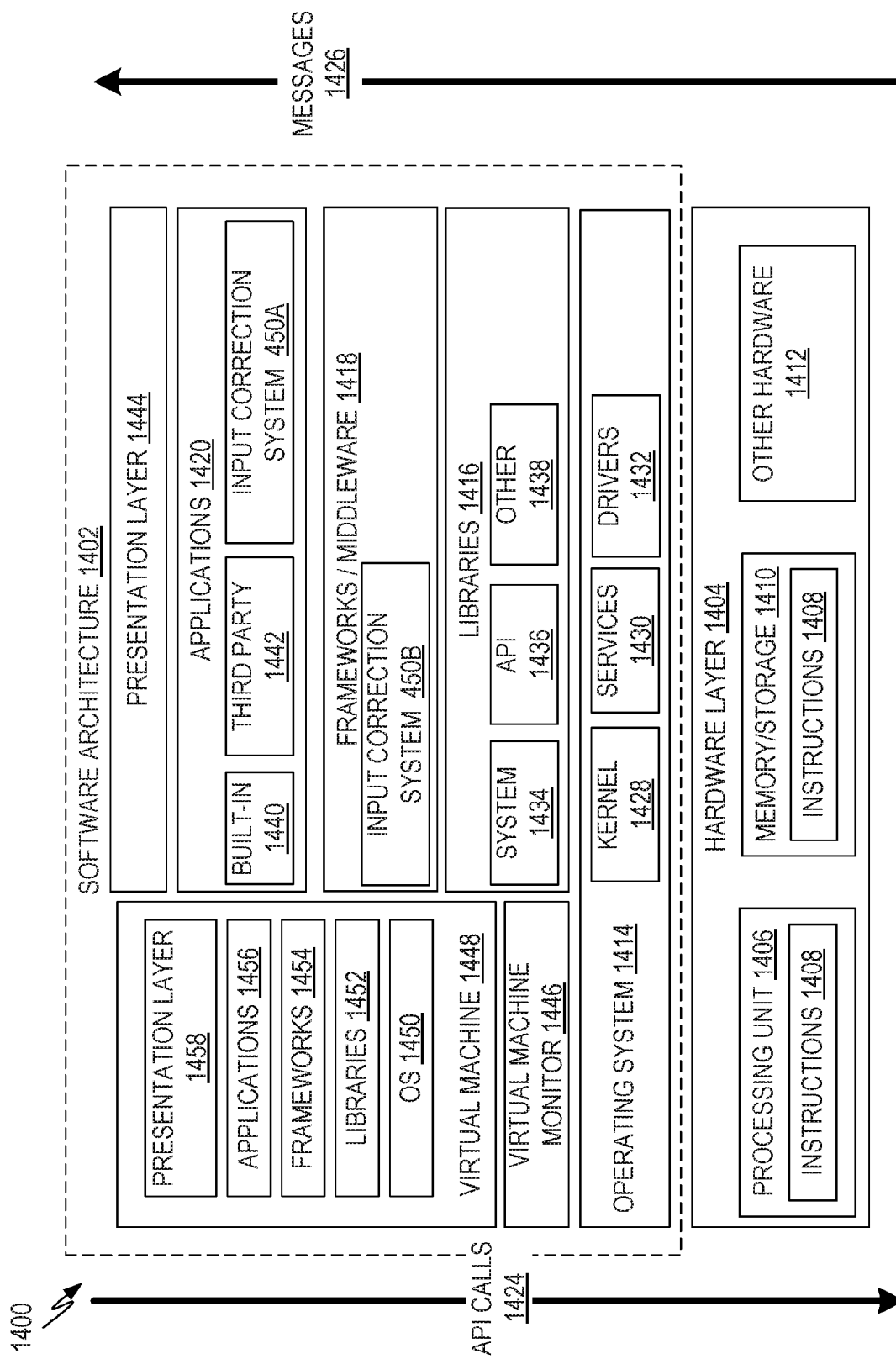
FIG. 14 is a block diagram illustrating an example of a software architecture that may be installed on a machine, according to some example embodiments.

FIG. 14 is a block diagram 1400 illustrating a representative software architecture 1402, which may be used in conjunction with various hardware architectures herein described. FIG. 14 is merely a non-limiting example of a software architecture 1402, and it will be appreciated that many other architectures may be implemented to facilitate the functionality described herein. The software architecture 1402 may be executing on hardware such as machine 1500 of FIG. 15 that includes, among other things, processors 1510, memory/storage 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. Executable instructions 1408 represent the executable instructions of the software architecture 1402, including implementation of the methods, modules and so forth of FIGS. 2-13. Hardware layer 1404 also includes memory and/or storage 1410, which also have executable instructions 1408. Hardware layer 1404 may also comprise other hardware 1412 which represents any other hardware of the hardware layer 1404, such as the other hardware illustrated as part of machine 1500.

In the example architecture of FIG. 14, the software architecture 1402 may be conceptualized as a stack of layers where each layer provides particular functionality. For example, the software architecture 1402 includes layers, such as, an operating system 1414, libraries 1416, frameworks/middleware 1418, applications 1420 and presentation layer 1444. Operationally, the applications 1420 or other components within the layers may invoke application programming interface (API) calls 1424 through the software stack and receive a response, returned values, and so forth illustrated as messages 1426 in response to the API calls 1424. The layers illustrated are representative in nature and not all software architectures have all layers. For example, some mobile or special purpose operating systems may not provide a frameworks/middleware 1418 layer, while others may provide such a layer. Other software architectures may include additional or different layers.

The operating system 1414 manages hardware resources and provide common services. The operating system 1414 may include, for example, a kernel 1428, services 1430, and drivers 1432. The kernel 1428 acts as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 are responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 provide a common infrastructure that may be utilized by the applications 1420 or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system libraries 1434 (e.g., C standard library) that provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

In one example embodiment, the input correction system 150 is implemented as an application. In another example embodiment, the input correction system 150 is implemented as a framework and/or middleware. In one example, the input module 420 uses one or more libraries 1416 to receive or parse user input in a user session. The selection module 440 may use one or more libraries 1416 to parse user input, perform bigram analysis on input strings, apply a regular expression, or perform other functions as described herein. In another example, the filter module 460 uses one or more libraries 1416 to store string pairs at a storage device (e.g., memory/storage 1410). Also, the correction module 480 may use one or more libraries 1416 to replace strings or portions of strings or perform other operations as described herein.

The frameworks/middleware 1418 (also sometimes referred to as middleware) may provide a higher-level common infrastructure that may be utilized by the applications 1420 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1420 and/or other software components/modules, some of which may be specific to a particular operating system or platform.

The applications 1420 include built-in applications 1440 or third party applications 1442. Examples of representative built-in applications 1440 may include, but are not limited to, a contacts application, a browser application, a book reader application, a location application, a media application, a messaging application, or a game application. Third party applications 1442 may include any of the built-in applications 1440 as well as a broad assortment of other applications. In a specific example, the third party application 1442 (e.g., an application developed using the Android™ or iOS™ software development kit (SDK) by an entity other than the vendor of the particular platform) is mobile software running on a mobile operating system such as iOS™, Android™, Windows® Phone, or other mobile operating systems. In this example, the third party application 1442 invokes the API calls 1424 provided by the mobile operating system, such as, operating system 1414 to facilitate functionality described herein.

In one example embodiment, one or more of the modules described in FIG. 4 are at least partially implemented as applications 1420. The applications 1420 may utilize built-in operating system functions (e.g., kernel 1428, services 1430, or drivers 1432), libraries (e.g., system libraries 1434, API libraries 1436, and other libraries 1438), frameworks/middleware 1418 to create user interfaces to interact with users of the input correction system 150. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the machine of FIG. 15, for example). The virtual machine 1448 is hosted by a host operating system (operating system 1414 in FIG. 14) and typically, although not always, has a virtual machine monitor 1446, which manages the operation of the virtual machine 1448 as well as the interface with the host operating system (e.g., operating system 1414). A software architecture executes within the virtual machine 1448 such as an operating system 1450, libraries 1452, frameworks/middleware 1454, applications 1456, or presentation layer 1458. These layers of software architecture executing within the virtual machine 1448 can be the same as corresponding layers previously described or may be different.

Example Machine Architecture and Machine-Readable Medium

Figure 15:
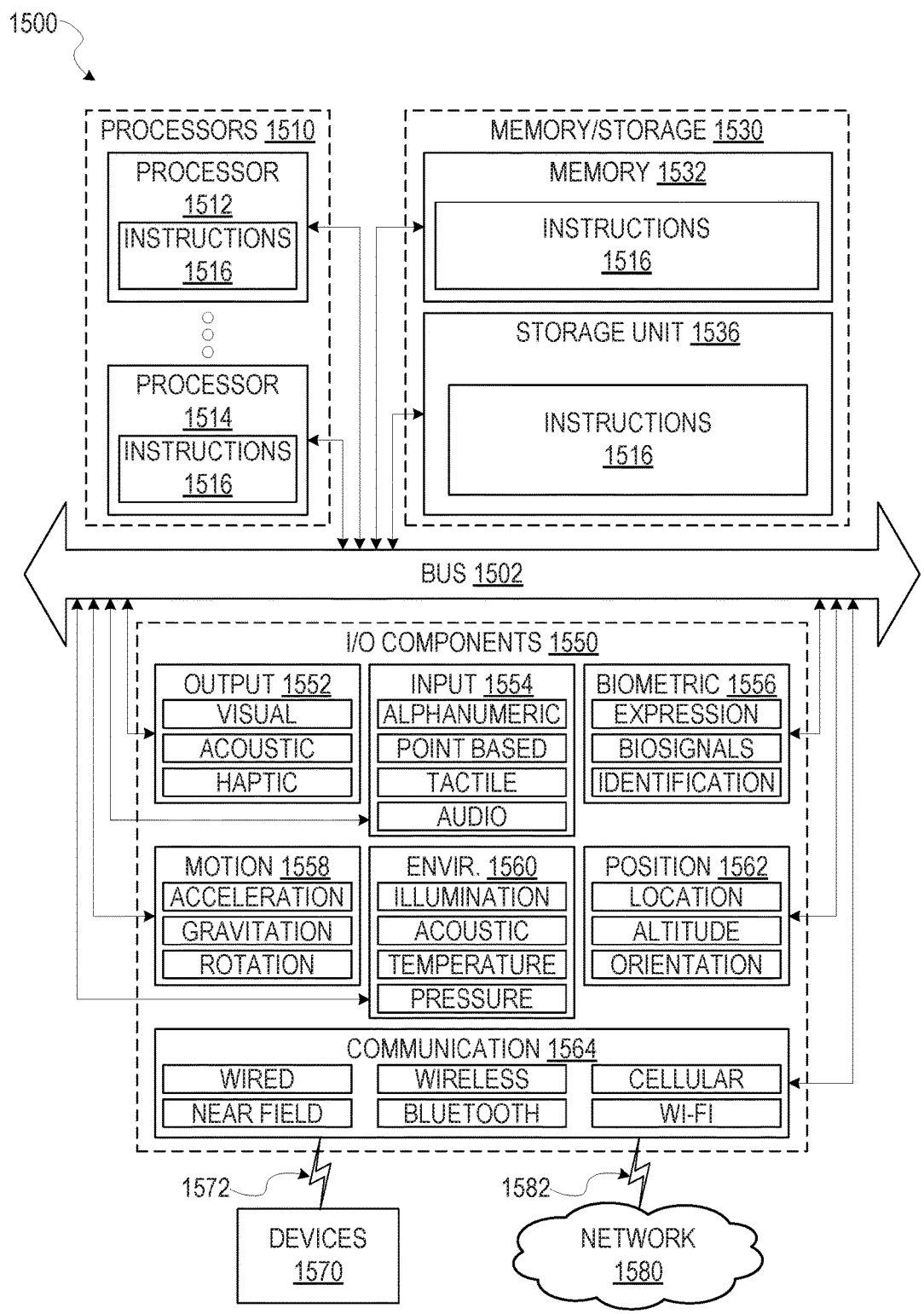
FIG. 15 illustrates a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute the flow diagrams of FIGS. 8-13. Additionally, or alternatively, the instructions 1516 may implement the input module 420, the selection module 440, the filter module 460, and the correction module 480 of FIG. 4, and so forth. The instructions 1516 transform the general, non-programmed machine into a particular machine programmed to carry out the described and illustrated functions in the manner described.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 includes processors 1510, memory/storage 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1512 and processor 1514 that may execute instructions 1516. The term "processor" is intended to include multi-core processor that may comprise two or more independent processors (sometimes referred to as "cores") that may execute instructions contemporaneously. Although FIG. 15 shows multiple processors 1510, the machine 1500 may include a single processor with a single core, a single processor with multiple cores (e.g., a multi-core process), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1550 includes biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572, respectively. For example, the communication components 1564 may include a network interface component or other suitable device to interface with the network 1580. In further examples, communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geo-location, location via Wi-Fi® signal triangulation, location via detecting an NFC beacon signal that may indicate a particular location, and so forth.

In one example embodiment, the input module 420 may receive the user strings from the network 104 using a communication device 1570. The input module 420 may also store received user string via the storage unit 1536. In another embodiment, the input module 420 receives the user strings via an alpha-numeric input component 1554.

Transmission Medium

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for correction of user input to a user session hosted by a computing system, the method comprising:
   receiving a first string from a user in a first user session;
   tracking a first response to the first string from the user in the first user session;
   receiving, after receiving the first string, a second string from the user in the first user session, the second string having a character operator difference that is below a threshold number from the first string;
   tracking a second response to the second string from the user in the first user session;
   associating the first string with the second string in response to the second response comprising a higher number of responses as compared with the first response;
   removing the association between the first string with the second string in response to the second string being a correction of the first string; and
   correcting, using the association, user input to a second user session by replacing a portion of the user input that matches the first string with the second string.

2. The method of claim 1, wherein the first string and the second string are selected using bigram character analysis.

3. The method of claim 1, further comprising removing the association in response to a language model use value for the first string in the string pair being above a threshold value.

4. The method of claim 1, further comprising removing the association in response to a language model use ratio being above a threshold value, the language model use ratio being a ratio of a language model use value of the first string to a language model use value of the second string in the string pair to be removed.

5. The method of claim 1, further comprising removing the association based on the second string in the selected string pair being a refinement of the first string in the selected string pair.

6. The method of claim 1, further comprising removing the association based on either the first string of the selected string pair or the second string in the selected string pair being in a predetermined language.

7. The method of claim 1, wherein the character operator difference is based on Damereau-Levenshtein distance.

8. A computer system to correct user input to a user session hosted by the computing system, the system comprising:
- a hardware processor;
- a memory device storing instructions that, when performed by the hardware processor, cause the computer system to perform operations comprising:
  - receiving a first string in a first user session;
  - tracking a first response to the first string from the user in the first user session;
  - receiving, after receiving the first string, a second string from the user in the first user session, the second string having a character operator difference that is below a threshold number from the first string;
  - tracking a second response to the second string from the user in the first user session;
  - associating the first string with the second string in response to the second response comprising a higher number of responses as compared with the first response;
  - removing an association between the first string with the second string in response to the second string being a correction of the first string; and
  - correcting, using the association, user input to a second user session by replacing a portion of the user input that matches the first string with the second string.

9. The computer system of claim 8, wherein the first string and the second string are selected using bigram character analysis.

10. The computer system of claim 8, wherein the operations further comprise removing the association in response to a language model use value for the first string in the string pair being above a threshold value.

11. The computer system of claim 8, wherein the operations further comprise removing the association in response to a language model use ratio being above a threshold value, the language model use ratio being a ratio of a language model use value of the first string to a language model use value of the second string in the string pair to be removed.

12. The computer system of claim 8, wherein the operations further comprise removing the association based on the second string in the selected string pair being a refinement of the first string in the selected string pair.

13. The computer system of claim 8, wherein the operations further comprise removing the association based on either the first string of the selected string pair or the second string in the selected string pair being in a predetermined language.

14. The computer system of claim 8, wherein the character operator difference is based on Damereau-Levenshtein distance.

15. A non-transitory machine-readable hardware medium having instructions stored thereon, which, when executed by a processor, cause the processor to perform operations to correct user input to a user session hosted by a computing system, the operations comprising:
- receiving a first string from a user in a first user session;
- tracking a first response to the first string from the user in the first user session;
- receiving, after receiving the first string, a second string from the user in the first user session, the second string having a character operator difference that is below a threshold number from the first string;
- tracking a second response to the second string from the user in the first user session;
- associating the first string with the second string in response to the second response comprising a higher number of responses as compared with the first response;
- removing an association between the first string with the second string in response to the second string being a correction of the first string; and
- correcting, using the association, user input to a second user session by replacing a portion of the user input that matches the first string with the second string.

16. The non-transitory machine-readable hardware medium of claim 15, wherein the first string and the second string are selected using bigram character analysis.

17. The non-transitory machine-readable hardware medium of claim 15, wherein the operations further comprise removing the association in response to a language model use value for the first string in the string pair being above a threshold value.

18. The non-transitory machine-readable hardware medium of claim 15, wherein the operations further comprise removing the association in response to a language model use ratio being above a threshold value, the language model use ratio being a ratio of a language model use value of the first string to a language model use value of the second string in the string pair to be removed.

19. The non-transitory machine-readable hardware medium of claim 15; wherein the operations further comprise removing the association based on the second string in the selected string pair being a refinement of the first string in the selected string pair.

20. The non-transitory machine-readable hardware medium of claim 15, wherein the operations further comprise removing the association based on either the first string of the selected string pair or the second string in the selected string pair being in a predetermined language.

* * * * *